United States Patent [19]
Bernardi

[11] 3,731,332
[45] May 8, 1973

[54] AUTOMATIC CAR WASH APPARATUS
[75] Inventor: Robert P. Bernardi, Dauphin County, Pa.
[73] Assignee: Bernardi Brothers, Inc., Harrisburg, Pa.
[22] Filed: Sept. 11, 1969
[21] Appl. No.: 857,027

[52] U.S. Cl. ............................15/21 E, 15/DIG. 2
[51] Int. Cl. ...............................................B60s 3/06
[58] Field of Search .....................15/DIG. 2, 21 D, 15/21 E, 53.97, 302

[56] References Cited
UNITED STATES PATENTS

| | | | |
|---|---|---|---|
| 2,941,221 | 6/1960 | Smith | 15/21 E |
| 3,251,084 | 5/1966 | Larson et al. | 15/21 D |
| 3,526,012 | 9/1970 | Cirino | 15/21 E |
| 3,614,800 | 10/1971 | Takeuchi | 15/21 E |
| 3,035,293 | 5/1962 | Larson | 15/21 D |
| 3,300,803 | 1/1967 | Seakan | 15/21 E |
| 3,428,983 | 2/1969 | Seakan | 15/21 E |

FOREIGN PATENTS OR APPLICATIONS

| | | | |
|---|---|---|---|
| 497,422 | 11/1953 | Canada | 15/DIG. 2 |
| 544,132 | 7/1957 | Canada | 15/DIG. 2 |
| 1,253,981 | 1/1961 | France | 15/DIG. 2 |
| 1,154,728 | 9/1963 | Germany | 15/DIG. 2 |

*Primary Examiner*—Edward L. Roberts
*Attorney*—Anthony A. O'Brien

[57] ABSTRACT

Automatic vehicle washing apparatus including a movable frame adapted to pass over a vehicle to be washed, a pair of side brushes and a top brush disposed on the frame to wash the vehicle as the frame passes over the vehicle a first time and to rinse the vehicle as the frame passes over the vehicle a second time, each side brush being arranged to wash more than half of the front end and rear end of the vehicle, and control means for controlling the sequence of operation of the apparatus with respect to the position of the frame relative to the vehicle.

14 Claims, 16 Drawing Figures

INVENTOR,
ROBERT P. BERNARDI
BY Anthony A. O'Brien
ATTORNEY

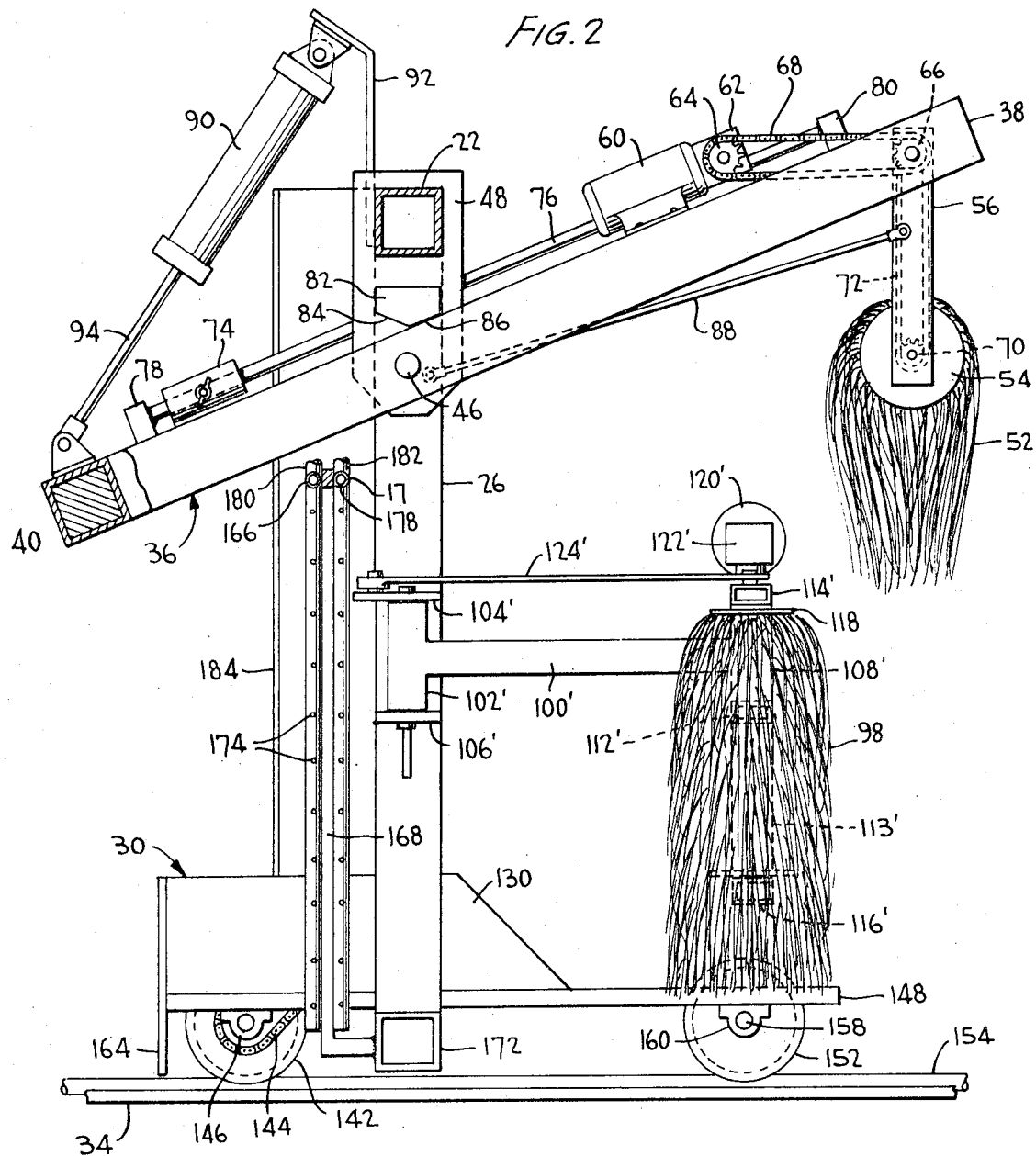

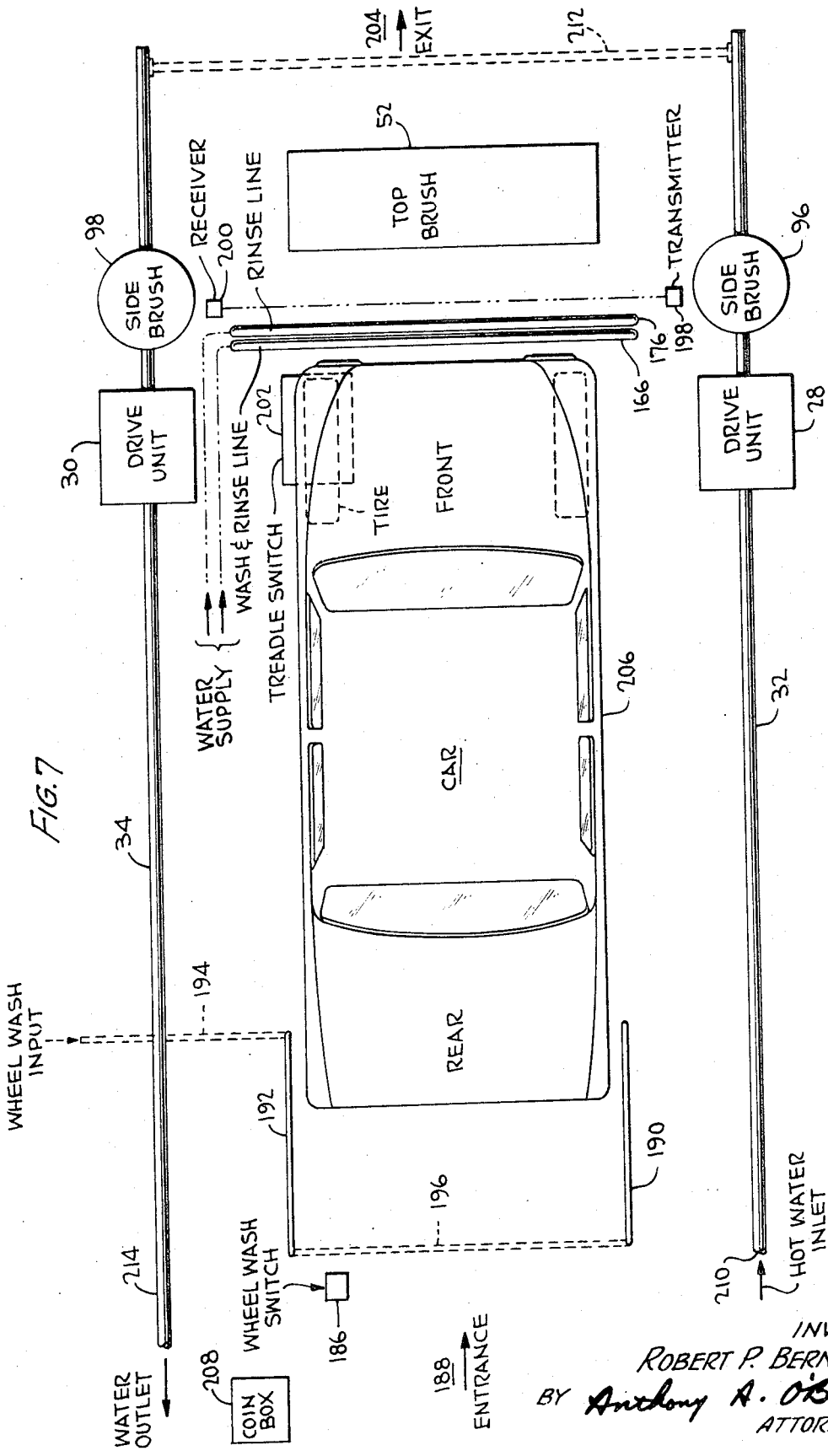

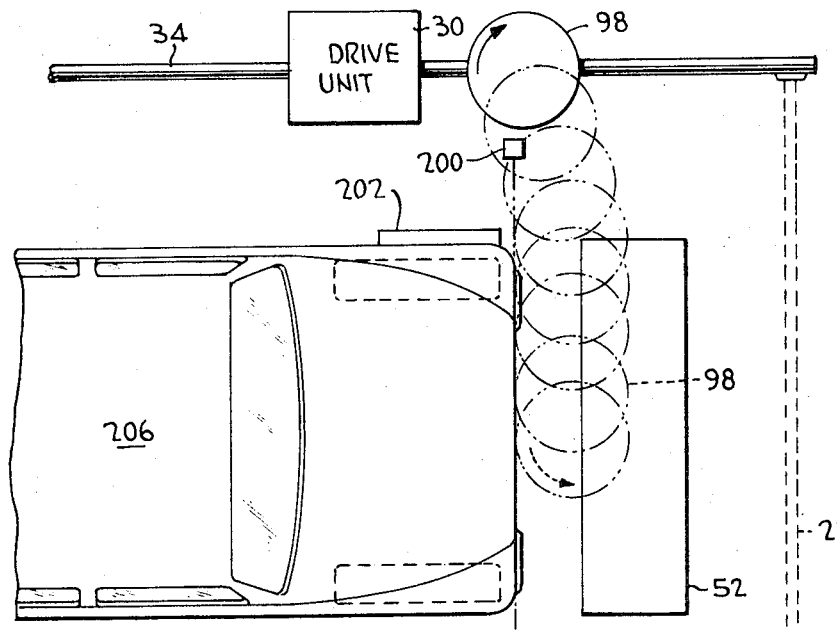
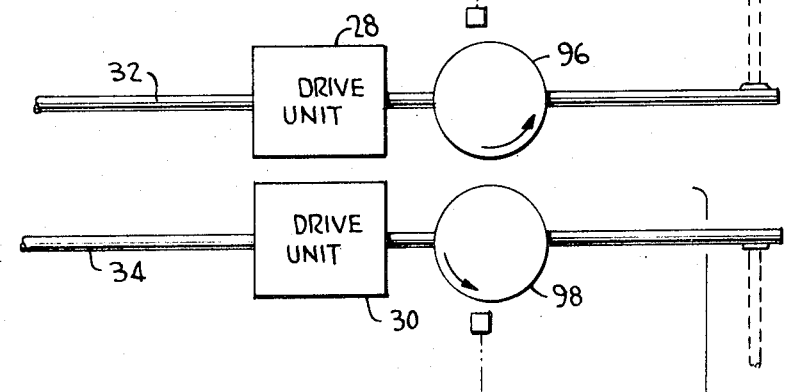
FIG. 8
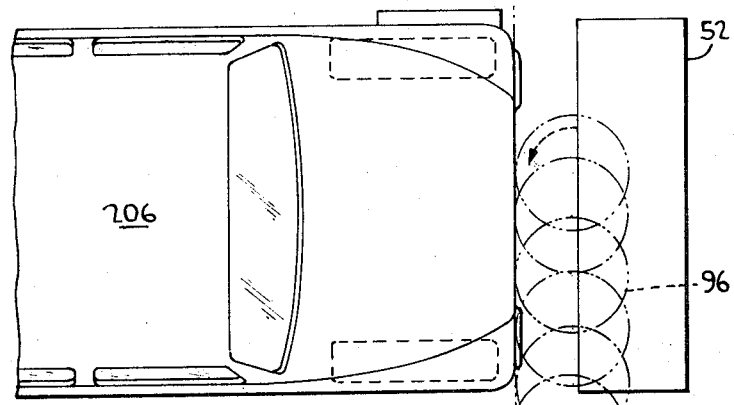
FIG. 9
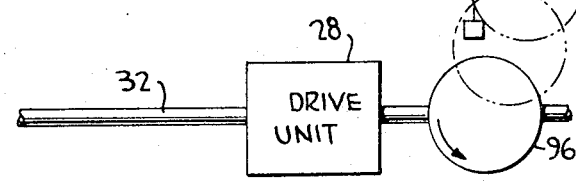

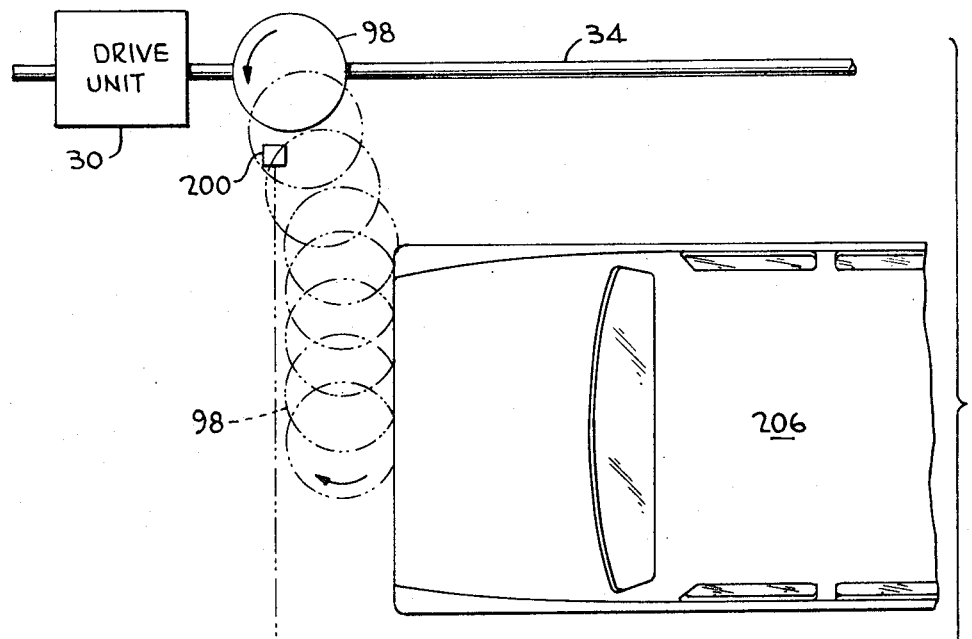
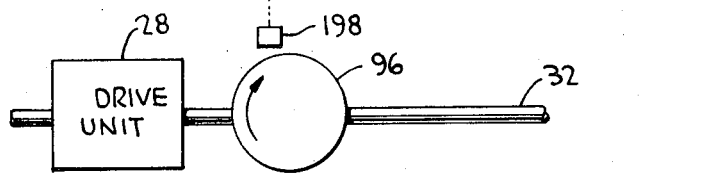
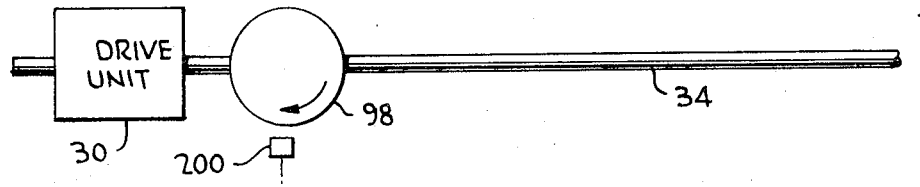
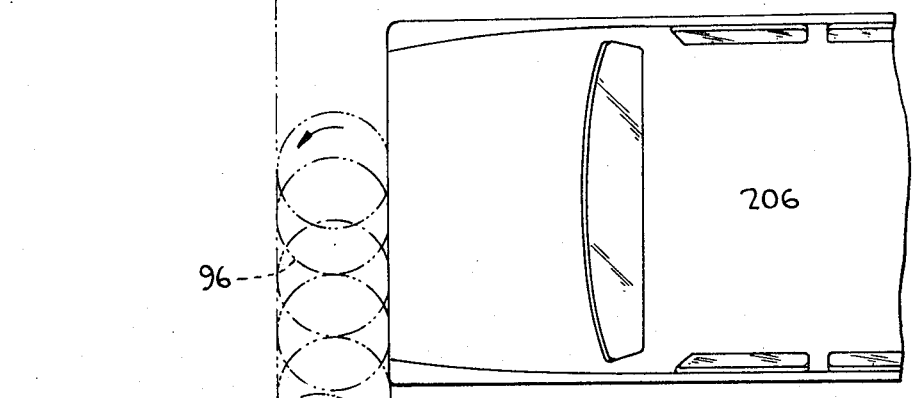
FIG. 12
FIG. 13
INVENTOR,
ROBERT P. BERNARDI
BY Anthony A. O'Brien
ATTORNEY

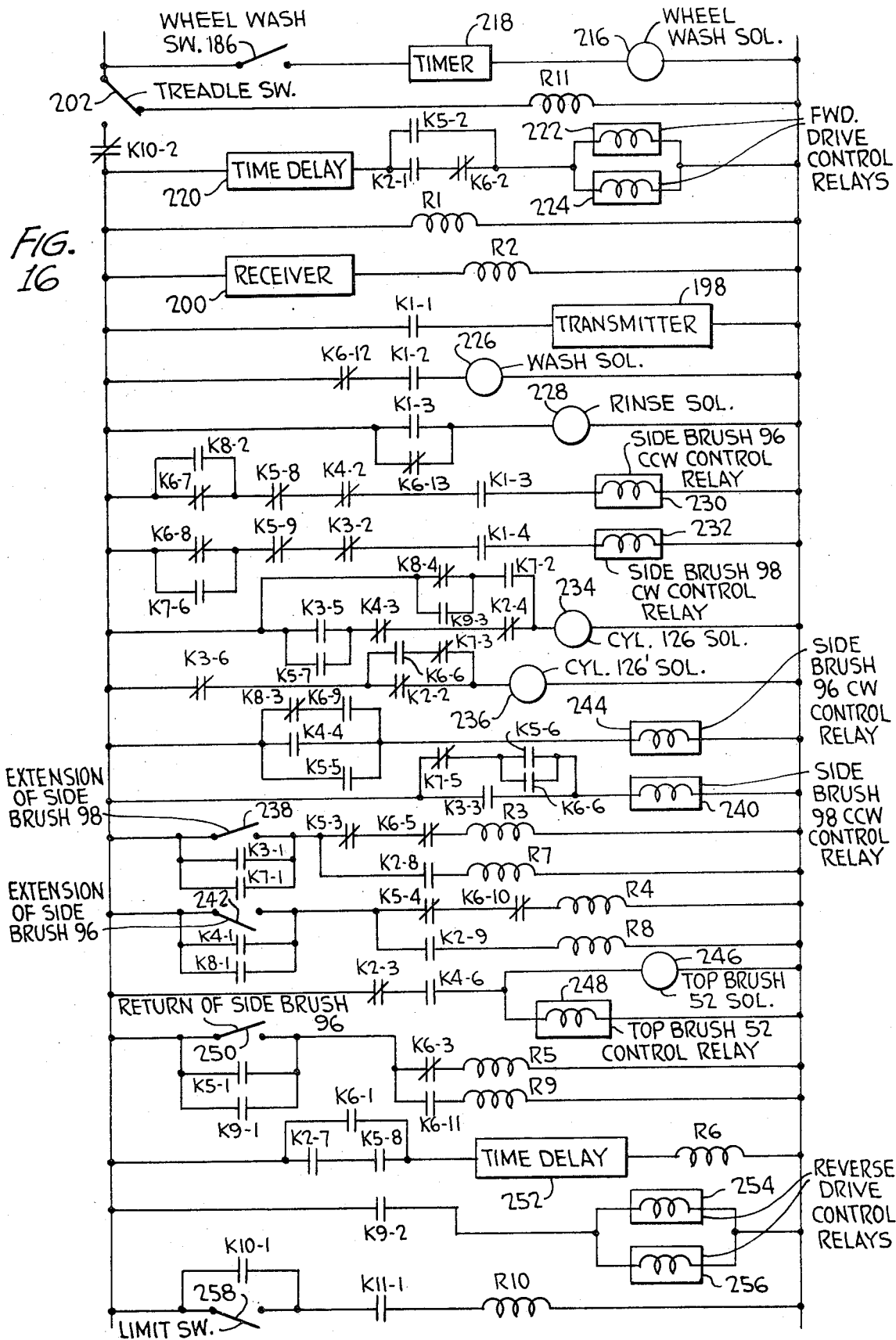

AUTOMATIC CAR WASH APPARATUS

BACKGROUND OF THE INVENTION

The present invention pertains to automatic vehicle washing apparatus and more particularly to such apparatus operative to pass a frame supporting brushes over a stationary vehicle to wash and rinse the vehicle.

As the standard of living increases in this and other countries, more people are buying new cars and caring for their new and used cars by regular washing. In order to handle the increased demand, a need has arisen for an improved automatic car wash apparatus. This need is due primarily to the many deficiencies in existing car wash installations, two of which are high cost and long washing time. While the demand is geared to economical, fast car washes minimizing the waiting time of the driver, there has been no reduction in the quality of the wash desired. That is, the car must be thoroughly and completely washed including hard-to-get places such as side rearview mirrors, wheels and front ends, for example, as well as the many surfaces on the roof, hood, trunk, and sides of modern automobiles.

Accordingly, there have been many attempts to construct a completely automatic car wash that is fast, thorough and inexpensive; and, while some of these qualities have been provided, it has always been at the expense of other equally important qualities.

Conventional apparatuses for washing cars are not entirely automatic in that they normally require manual cleaning of some parts of the car due to the inability of automatically operated brushes to completely and thoroughly wash the car. In particular, the most difficult problems exist in the washing of the front end due to the many varying surfaces, protrusions and indentations in the grill, lights, tags and other equipment of modern automobiles. Similarly, the rear end of modern automobiles have presented a problem for thorough automatic washing.

Attempts to provide an automatic vehicle washing apparatus that operates to wash a vehicle as the vehicle passes by the stationary apparatus have been highly unsuccessful due primarily to the inconsistant movement of the vehicle and the space required between various brushes disposed along the direction of travel of the vehicle past the apparatus.

Recently, vehicle washing apparatuses have been constructed that are designed to pass over a stationary vehicle; however, as yet such apparatuses have not met with success due to the many brushes and controls therefor required and the difficulty of completely washing the front and rear ends of the vehicle. Specifically such apparatuses are normally disposed at the exit of an enclosed wash bay, and a frame supporting the apparatus moves from the exit to the entrance of the wash bay passing over and washing the stationary vehicle from the front end to the rear end. As the frame approaches the entrance of the wash bay, it actuates a switch located near the entrance and reverses direction to pass over the vehicle at least one more time. One problem involved with such operation is that when vehicles of various sizes and shapes are to be washed, the washing operation for the rear end of the vehicle is not thorough. This is caused primarily by the use of control circuitry to sense the position of the moving frame relative to the wash bay rather than relative to the vehicle, and when a small vehicle is positioned for washing its front end will be properly aligned at the exit for thorough washing but its rear end will be spaced from the entrance. Another problem as yet unsolved in movable vehicle washing apparatuses is the unwashed area normally existing between brushes located on the sides of the frame as they simultaneously wash the front end or the rear end of the vehicle.

The time necessary to thoroughly wash a vehicle is crucial; and, due to the requirement that movable vehicle washing apparatuses always start from the same position, if a vehicle cannot be thoroughly washed in two passes over the vehicle, the washing time is doubled. Conventional movable washing apparatuses require more than one full cycle of operation, that is, two passes over the vehicle, to thoroughly wash a vehicle, and thus have encountered the problem of either uneconomical operation or low quality washing.

SUMMARY OF THE INVENTION

Accordingly, it is an object of the present invention to construct vehicle washing apparatus capable of thoroughly washing vehicles automatically regardless of their physical dimensions.

Another object of the present invention is to control the operation of vehicle washing apparatus adapted to move over a stationary vehicle by determining the location of the apparatus relative to the vehicle.

The present invention has another object in that vehicle washing apparatus utilizes a high frequency link disposed on a movable frame such that the vehicle to be washed interrupts the link while the frame moves over the vehicle.

Another object of the present invention is to completely and thoroughly wash a stationary vehicle by passing a frame supporting a top brush and two side brushes over the vehicle in only one complete cycle.

A further object of the present invention is to utilize each of a pair of side brushes supported on a movable frame to wash more than half of the front and rear ends of a vehicle such that the overlapping washed area assures a thorough and complete washing of the vehicle.

Another object of the present invention is to construct vehicle washing apparatus that provides thorough washing in a completely automatic manner yet utilizes relatively simple structure.

The present invention has another object in that the side brushes of vehicle washing apparatus are supported by double-pivot assemblies.

A further object of the present invention is to use a rectangular support pivotally connected with the top of a movable frame to rotatably support a top brush for a vehicle washing apparatus to permit the top brush to follow the contour of a vehicle to be washed.

Another object of the present invention is to utilize a high pressure spray for washing and rinsing a vehicle in cooperation with rotating brushes to avoid scratching painted surfaces of the vehicle.

Some of the advantages of the present invention over the prior art are that vehicles of varying sizes and shapes may be thoroughly washed without wasting time or materials, that a stationary vehicle may be washed in an extremely short period of time due to the need for only two passes of the frame over the vehicle, that apparatus is entirely automatic thereby obviating the need for attendants, and that the front end and the rear end of the vehicle, which are the most difficult areas to clean, are thoroughly washed.

The present invention is generally characterized in automatic vehicle washing apparatus including a frame, driving means for driving the frame in a first direction and a second direction opposite the first direction, top brush means, a top brush support assembly having support means for rotatably supporting the top brush means on the top of the frame, motor means for rotating the top brush means, first side brush means, a first side brush assembly having a first member pivotally supported by a first side of the frame and support means pivotally supported by the first member for rotatably supporting the first side brush means, second side brush means, a second side brush assembly having a second member pivotally supported by a second side of the frame and support means pivotally supported by the second member for rotatably supporting the second side brush means and motor means for rotating the first side brush means and the second side brush means whereby the driving means drives the frame past a vehicle to be washed while the top brush means washes the upper surfaces of the vehicle and the first and second side brush means wash the sides of the vehicle and the front and rear ends of the vehicle in an overlapping manner.

Further objects and advantages of the present invention will become apparent from the description of the preferred embodiment as shown in the accompanying drawings.

BRIEF DESCRIPTION OF THE DRAWINGS

FIG. 2 is a sectional side elevation of the apparatus of FIG. 1 taken along lines 2—2.

FIG. 7 is a diagrammatic plan view of a wash bay housing the apparatus of the present invention.

FIGS. 8 and 9 are diagrammatic plan views illustrating the washing of the front end of a vehicle by the side brushes of the apparatus of FIG. 1.

FIGS. 12 and 13 are diagrammatic plan views illustrating the washing of the rear end of a vehicle by the side brushes of the apparatus of FIG. 1.

FIG. 16 is a schematic diagram of a control system for the vehicle washing apparatus of the present invention.

DESCRIPTION OF THE PREFERRED EMBODIMENT

Vehicle washing apparatus according to the present invention is illustrated in perspective in FIG. 1 and is described hereinafter for use with automobiles; however, the apparatus may be used to wash any variety of vehicle due to the unique location and operation of the brushes and the unique sequence of operation of the apparatus.

Figure 1:
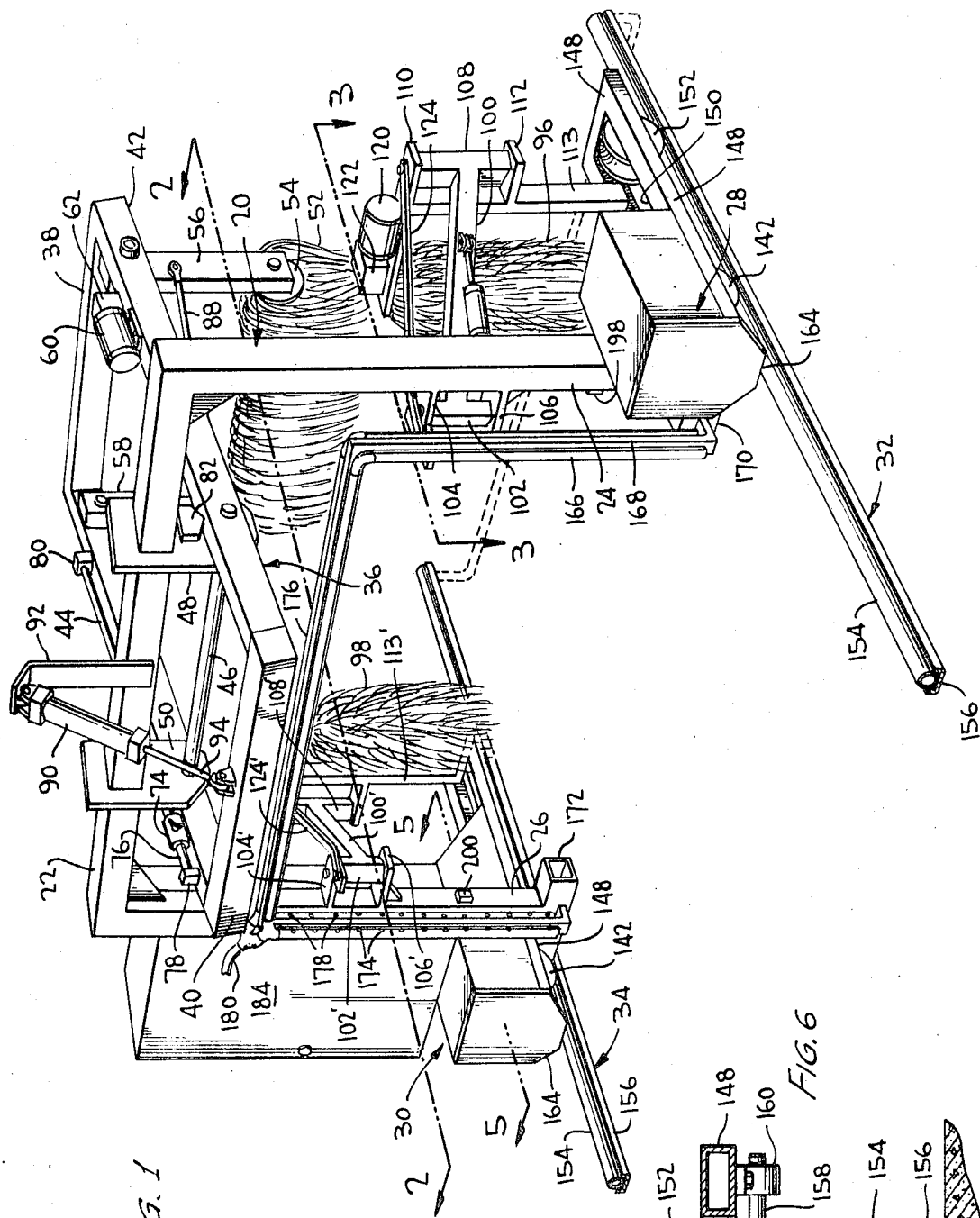
FIG. 1 is a perspective view of vehicle washing apparatus according to the present invention.

As illustrated in FIG. 1, the apparatus of the present invention includes an inverted U-shaped frame 20 made of tubular steel and having a top member 22 and side members 24 and 26 which are attached to drive units 28 and 30 at their lower ends, respectively. Drive units 28 and 30 are adapted to ride on a pair of parallel rails 32 and 34, respectively, which extend throughout the length of a wash bay housing the apparatus.

A rectangular frame or support 36, including end members 38 and 40 and side members 42 and 44, is pivotally supported from top member 22 of U-shaped frame 20 on a shaft 46 supported by a pair of hexagonal plates 48 and 50, as best shown in FIG. 2. A rotatable top brush 52 has a hub assembly generally indicated at 54 supported by a pair of arms 56 and 58 which are pivotally mounted at the end of frame 36 adjacent end member 38.

An electric motor 60 and suitable gear means 62 are mounted on side member 42 of frame 36 adjacent arm 56, and a sprocket 64 attached to gear means 62 drives a sprocket 66 disposed in the end of arm 56 through a chain 68. Sprocket 66 drives a sprocket 70 secured to hub assembly 54 through a chain 72 to rotate top brush 52. End member 40 is filled with lead to act as a counter balance for top brush 52, and an adjustment weight 74 is slidably disposed on a rod 76 which is mounted on blocks 78 and 80 secured to the upper surface of side member 44 of frame 36. Weight 74 may be slidably moved along rod 76 to accurately balance frame 36 to permit precise balancing of the weight of top brush 52 and the counter balancing weight of end member 40 and permit compensation for brush wear. Since weight 74 is disposed on the opposite side of frame 36 from motor 60, frame 36 is laterally as well as pivotally balanced.

A pentagonal stop 82 is secured to plate 48 such that its angled sides 84 and 86 limit the pivotal movement of frame 36 about shaft 46. A connecting rod 88 is secured to plate 48 and arm 56 in order to maintain top brush 52 at its proper angle. An air cylinder 90 is secured to the offset end of a member 92 extending vertically from top member 22 of frame 20, and the piston 94 of air cylinder 90 is secured to end member 40 of frame 36. Piston 94 is normally extended to maintain top brush 52 in its rest position, as shown in FIG. 2, well above the height of a vehicle to be washed.

Side brushes 96 and 98 are pivotally supported on either side of frame 20 by side members 24 and 26, respectively; and, since the supporting and control structure for each side brush is the same, only the assembly for side brush 96 will be described hereinafter. The elements of the assembly for side brush 98 corresponding to the elements described with respect to the assembly for side brush 96 are given the same reference numerals with primes.

Figure 3:
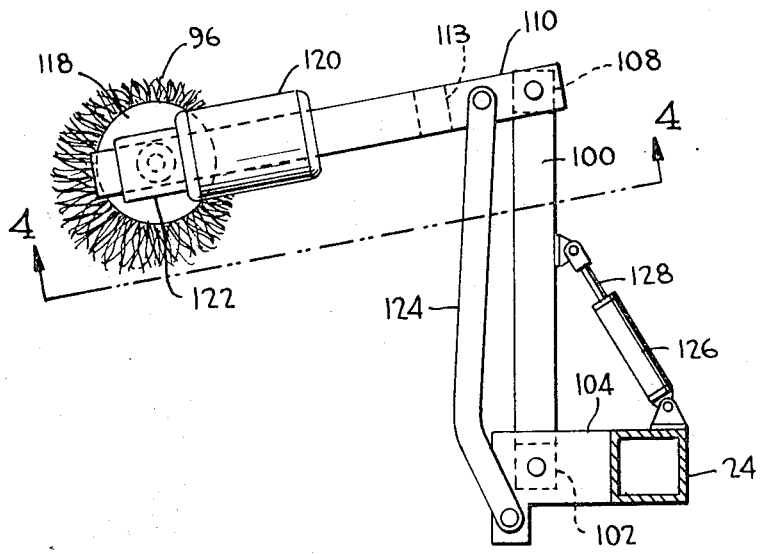
FIG. 3 is a sectional top view of a side brush assembly of the apparatus of FIG. 1 taken along lines 3—3.
Figure 4:
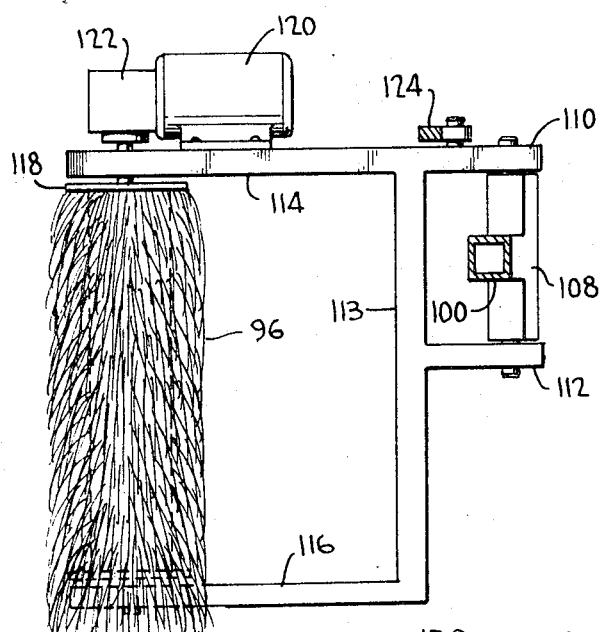
FIG. 4 is a sectional side elevation of the side brush assembly of FIG. 3 taken along lines 4—4.

As illustrated in FIGS. 3 and 4 the assembly for side brush 96 includes a member 100 having a T-shaped end 102 pivotally mounted between a pair of vertically spaced flanges 104 and 106 secured to side member 24 of frame 20. Member 100 has a second T-shaped end 108 pivotally mounted between vertically spaced horizontal arms 110 and 112 of a small clevis which is integrally formed with a larger clevis by a common vertical member 113. The larger clevis has a horizontal upper arm 114 vertically spaced from a horizontal lower arm 116, and arms 114 and 116 rotatably support a hub assembly 118 for side brush 96. An electric motor 120 and suitable gear means 122 are secured to the upper surface of arm 114 and are rotatably coupled to hub assembly 118 to drive side brush 96. A connecting rod 124 is attached to flange 104 and the upper surface of arm 110 to maintain side brush 96 at its proper angle. A hydraulic cylinder 126 is attached to side member 24 and has a piston 128 attached to member 100.

Side brushes 96 and 98 are shown in their rest positions in FIG. 1 and are shown partially extended in FIGS. 2, 3 and 4. To place side brushes 96 and 98 in their operating positions cylinders 126 and 126' are actuated to push pistons 128 and 128' out to pivot members 100 and 100', respectively, into the center of the wash bay. The double pivotal nature of the ends 102 and 108 of member 100 permits thorough washing of the front and rear ends of a vehicle as will be explained hereinafter.

Figure 6:
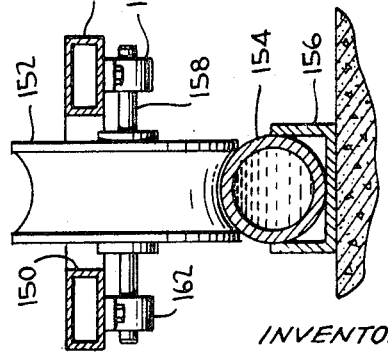
FIG. 6 is a sectional view of the drive unit of FIG. 5 taken along lines 6—6.
Figure 5:
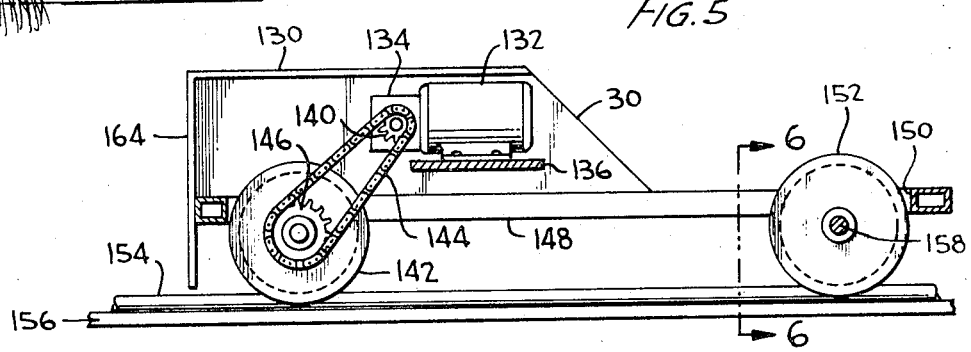
FIG. 5 is a sectional side elevation of a drive unit of the apparatus of FIG. 1 taken along lines 5—5.

Drive units 28 and 30 are similar in construction; and, consequently, only drive unit 30 will be described hereinafter. Corresponding elements in drive units 28 and 30 are given identical reference numerals. As illustrated in FIG. 5, drive unit 30 includes a housing 130 supporting an electric motor 132 and suitable gear means 134 on a ledge 136. A sprocket 140 is driven by gear means 134 and drives a wheel 142 through a chain 144 and a sprocket 146 connected with wheel 142. Housing 130 is supported on a chassis 148 which has a slot 150 through its center for receiving wheel 142 and a wheel 152. As shown in FIG. 6, wheel 152 is grooved to accomodate rail 34 which is formed by a pipe 154 of circular cross section set in a flat-bottomed channel member 156. An axle 158 is supported in hubs 160 and 162 which are secured to chassis 148. Chassis 148 is secured in a similar manner to the hubs of wheel 142 which is constructed in the same manner as wheel 152 with the addition of sprocket 146. A hexagonal plate 164 covers the front of housing 130 and extends below chassis 148 to act as a scraper to remove foreign objects from the rails that might adversely affect operation of the apparatus.

An inverted U-shaped wash pipe 166 is supported by an inverted U-shaped member 168 that is secured at its lower ends to flanged portions 170 and 172 of frame 20, and a plurality of nozzles 174 are arranged on the upstanding legs and the top of pipe 166 to spray washing fluid such as water and detergent and rinse water on a vehicle to be washed. An inverted U-shaped rinse pipe 176 is disposed adjacent wash pipe 166 and is supported by member 168, and rinse pipe 176 has nozzles 178 on the upstanding legs and top thereof to rinse the vehicle after washing by spraying clean water on the vehicle. A flexible hose 180 communicates with wash pipe 166 and rinse pipe 176 to permit the spraying of washing fluid and rinse water while frame 20 is moving. A high pressure pump, not shown, selectively supplies washing fluid and rinse water to hose 180, and solenoid valves are provided in wash pipe 166 and rinse pipe 176 to permit washing fluid to be sprayed from wash pipe 166 and rinse water to be sprayed from both rinse pipe 176 and wash pipe 166 as will be explained hereinafter.

A water tight enclosure 184 is mounted on the top of housing 130 of drive unit 30 and further supported by side member 26. Enclosure 184 houses the control circuitry for the apparatus to assure proper sequence of operation.

FIG. 7 is a schematic plan view of a wash bay according to the present invention showing top brush 52 and side brushes 96 and 98 in their rest positions. A wheelwash, pressure actuated switch 186 is located at an entrance 188 for the wash bay and is actuated by driving a vehicle to be washed over a pressure plate set in the floor of the wash bay. A timer may be connected with switch 186 to assure that the wheel washing equipment, to be described hereinafter, is activated for a predetermined period of time sufficient to thoroughly wash the wheels of the vehicle as it is driven into the wash bay. For this same purpose a micro-switch having a wand adapted to engage the left side of the vehicle may be employed such that the wheel washing equipment is activated only while the wand engages the side of the vehicle. The wheel washing equipment includes two pipes 190 and 192 having a length of about five feet and disposed in parallel on either side of the entrance 188 to the wash bay. The spacing of pipes 190 and 192 may be determined in accordance with the maximum width of vehicles to be washed. Pipes 190 and 192 have nozzles arranged thereon and directed at an angle from the horizontal to supply a high pressure jet of washing fluid such as detergent and water to the wheels of the vehicle. The washing fluid to be dispensed by pipes 190 and 192 is supplied through underground pipes 194 and 196 which connect pipes 190 and 192 in series. Rotary wheel brushes may be used in conjunction with the high pressure spray to thoroughly clean tire sidewalls.

The control system for the apparatus includes a high frequency link comprising a conventional high frequency transmitter 198 and a conventional high frequency receiver 200. Transmitter 198 and receiver 200 are secured to the inner surfaces of side members 24 and 26 of frame 20 to permit the signal from transmitter 198 to be received by and to actuate receiver 200. A treadle switch 202 is located in the floor near an exit 204 of the wash bay at a position such that the left front tire of a car 206 will actuate the treadle switch when the car is in proper position for washing. A conventional coin and currency acceptance device 208 is located on the left or driver's side in front of entrance 188 to receive payment in advance for the car wash. Device 208 controls the operation of the control circuitry such that the vehicle washing apparatus cannot be actuated until the proper payment has been made.

For use in cold weather, hot water is circulated through pipes 154 of rails 32 and 34 by way of an inlet 210, a connecting pipe 212 under the floor at exit 204 of the wash bay, and an outlet 214 such that radiated heat from pipes 154 warms the wash bay.

Top brush 52 and side brushes 96 and 98 are preferably Paralax brushes having long fiberous strands extending from the hub assemblies of the brushes such that the brushes conform to the contour of the various surfaces and windows of a vehicle to assure complete and thorough washing. The long strands of the brushes also permit thorough washing of indentations and protrusions such as those in the grill of most modern cars.

Side brushes 96 and 98 have a diameter of approximately 3 feet, a height of approximately 3 feet and are mounted approximately 1 foot from the floor of the wash bay. When rotating, side brushes 96 and 98 flare up and down to provide an extension of about 6 inches at either end in order to assure complete washing of the sides, front end, rear end and side windows of a vehicle. Top brush 38 has a length of approximately 4 feet, 4 inches and flares at the ends to provide an extension of from 8 to 10 inches at either end in order to assure complete coverage of the hood, roof and trunk of the vehicle and permit slight overlapping coverage with the side brushes.

The operation of the vehicle washing apparatus of the present invention will now be described with reference to the control system of FIG. 16 which includes control relays 222, 224 and 254, 256 to provide forward and reverse movement of drive units 28 and 30, respectively, control relays 230, 240 and 244, 232 to provide counterclockwise and clockwise rotation of side brushes 96 and 98, respectively, a control relay 248 to provide rotation of the top brush 52, a solenoid 216 for controlling wheel washing, solenoids 226 and 228 for controlling wash and rinse water, respectively, solenoids 234 and 236 for controlling cylinders 126 and 126' for side brushes 96 and 98, respectively, and a solenoid 246 for controlling top brush cylinder 90. Control relays 222, 224, 230, 232, 240, 242, 254 and 256 each control contacts to drive electric motors in a desired direction. Solenoids 216, 226 and 228 control valves for supplying washing and/or rinsing liquid, and solenoids 234, 236 and 246 operate valves in a fluidic control system to operate fluid motors or cylinders. The control circuit includes wheel wash switch 186, treadle switch 202, microswitches 238 and 242 which are actuated by full extension of side brushes 98 and 96, respectively, a microswitch 250 which is actuated by return of brush 96 to its rest position and a limit switch 258 which is actuated by movement of the frame past a position adjacent the exit 204 of the bay in a direction toward the exit, and the control circuit further includes relay windings R1 – R11 having associated contacts connected with the various control relays, solenoids and switches to provide sequential control of the vehicle washing apparatus.

In operation car 206 is driven into the wash bay after proper payment is received by device 208 and actuates wheel-wash switch 186 which actuates solenoid 216 to open a valve to supply washing fluid to pipes 190 and 192. The high pressure spray from pipes 190 and 192 washes the front and rear wheels on both sides of car 206 and the underside of the car. After a predetermined period of time the wheel washing equipment is deactuated under the control of an adjustable timer 218 to stop the supply of washing fluid to pipes 190 and 192. Car 206 is then parked with its left front wheel on treadle switch 202. A light may be provided on the walls of the wash bay or on frame 20 to indicate to the driver that the car is in proper position for washing.

After a short delay provided by a time delay circuit 220 the actuation of treadle switch 202 by the left front tire of car 206 energizes the control circuitry to actuate forward drive control relays 222 and 224 for drive units 28 and 30, respectively, to drive frame 20 from exit 204 and the front of car 206 towards entrance 188 and the rear of car 206 and to complete the high frequency link from transmitter 198 to receiver 200 by energizing relay winding R1 to close contacts K1-1. At this time the washing fluid is supplied to wash pipe 166 to provide a high pressure spray from nozzles 174 onto car 206 due to the energization of solenoid 226 through contacts K6-12 and contacts K1-2. The solenoid valve 228 in rinse pipe 176 is closed due to the opening of contacts K1-3 to prevent washing fluid from being sprayed therefrom. Actuation of treadle switch 202 energizes motors 120 and 120' by means of control relays 230 and 232, which are energized through contacts K6-7, K5-8, K4-2 and K1-3 and contacts K6-8, K5-9, K3-2 and K1-4, respectively, to rotate side brushes 96 and 98 counterclockwise and clockwise, respectively; however cylinders 126 and 126' are not actuated to maintain side brushes 96 and 98 in their rest positions such that they do not contact car 206 due to the deenergization of solenoids 234 and 236 caused by open contacts K3-5, K5-7 and K7-2 and open contacts K2-2, respectively. As frame 20 moves towards the front of car 206, the car is thoroughly washed with fluid under high pressure from pipe 166.

When the high frequency link is interrupted by the front end of car 206, as shown in FIGS. 8 and 9, relay winding R2 is deenergized to open contacts K2-1 and deenergize control relays 222 and 224 to stop drive units 28 and 30 are deenergized for a predetermined period of time. The interruption of the link energizes solenoid 236 through contacts K2-2 to actuate cylinder 126' to pivot member 100' towards the center of the wash bay. Side brush 98 is thereby moved across the left front end of car 206 rotating in a clockwise direction to thoroughly wash more than half of the front end of the car. Cylinder 126' continuously applies pivotal pressure to member 100' to force side brush 98 against the front end of the car for thorough washing. After side brush 98 is fully extended, as shown in FIG. 8, microswitch 238 is actuated to energize relay winding R3 and close contacts K3-3 thereby energizing control relay 240 to reverse the rotation of side brush 98, and side brush 98 washes the front end of the car again as it returns to its rest position due to the deenergization of solenoid 236 by the opening of contacts K3-6.

At the time that side brush 98 commences its return stroke, cylinder 126 is actuated by energization of solenoid 234 through contacts K3-5 to pivot member 100 and move side brush 96, which is rotating counterclockwise, across the right front end of the car to complete the washing thereof. Similar to the operation of side brush 98, side brush 96 washes more than half of the front end of the car to assure complete washing of the front end, as shown in FIG. 9. Upon full extension of side brush 96, microswitch 242 is actuated to energize relay winding R4 and close contacts K4-4 thereby energizing control relay 244 to reverse the rotation such that side brush 96 rotates clockwise on its return stroke across the front end of the car caused by the deenergization of solenoid 234 from the opening of contacts K4-3. Cylinder 126 causes side brush 96 to wash the front end under pressure in the same manner as described with respect to side brush 98. By starting the forward stroke of side brush 96 when side brush 98 starts its return stroke, the time required to provide overlapping washing of the front end is reduced to a minimum. The double pivotal action of the side brush assemblies in cooperation with connecting rods 124 and 124' permit side brushes 96 and 98 to contact the front end of the vehicle under pressure and at the proper angle for thorough washing. After the front end of car 206 has been thoroughly washed, side brushes 96 and 98 are in their rest positions with side brush 96 rotating clockwise and side brush 98 rotating counterclockwise.

When side brush 96 has reached its fully extended position, top brush 52 which has been in its rest position in a non-rotating condition is moved to its operating position by deactuation of cylinder 90 due to enerization of solenoid 246 through contacts K4-6 to pivot frame 36 on shaft 46. At this time motor 60 is energized by control relay 248 through contacts K4-6 to rotate top brush 52 in a counterclockwise direction when viewing the apparatus from the right side.

Figure 10:
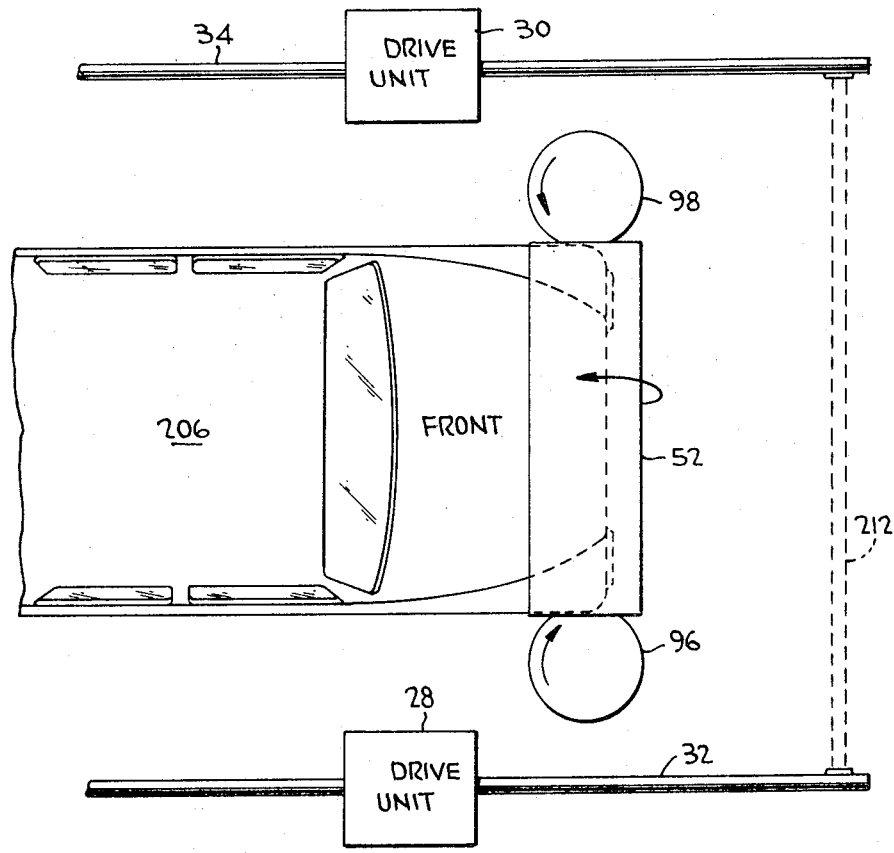
FIGS. 10 and 11 are diagrammatic plan views illustrating the washing of the sides and upper surfaces of a vehicle by the side and top brushes of the apparatus of FIG. 1.
Figure 11:
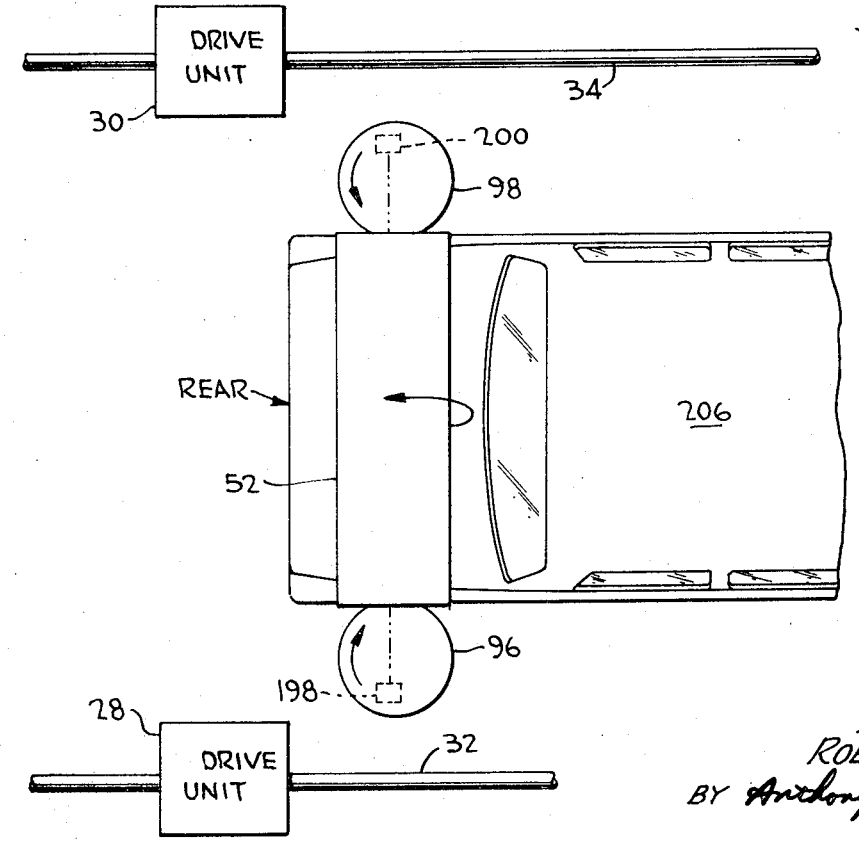

After top brush 52 is placed in its operating condition, and side brush 96 has returned to its rest position, microswitch 250 is actuated by side brush 96 to energize a relay winding R5 such that drive units 28 and 30 are reenergized by control relays 222 and 224 through contacts K5-2 to move frame 20 towards entrance 188 of the wash bay and the rear end of car 206. During this movement side brushes 96 and 98 are moved against the sides of the car by cylinders 126 and 126' due to the energization of solenoids 234 and 236 through contacts K5-7 K4-3 and K2-4 and contacts K3-6 and K2-2, respectively, to thoroughly wash the sides and side windows of the car. Top brush 52 washes the hood, front window, roof, rear window and trunk of car 206 in alignment with side brushes 96 and 98 as shown in FIGS. 10 and 11. Any problems that might be caused by the overlapping nature of top brush 52 and side brushes 96 and 98 are obviated by the rotation and general movement of the brushes in the same direction to prevent entanglement of the strands. Side brushes 96 and 98 engage the surfaces of the car under pressure from cylinders 126 and 126', respectively, and top brush 52 engages the surfaces of the car under the pressure of its own weight as counter balanced by end member 40 and adjusted by weight 74.

After frame 20 is moved past the rear end of car 206 the high frequency link between transmitter 198 and receiver 200 is completed to energize relay winding R2 and open contacts K2-3 thereby actuating and cylinder 90 and deactuating motor 60 to place top brush 52 in its rest position and to stop the rotation of top brush 52. The completion of the link also deactuates cylinders 126 and 126' by opening contacts K2-4 and K2-2 to place side brushes 96 and 98, respectively, in their rest positions while they continue to rotate. Drive units 28 and 30 are deenergized a short time after completion of the link due to energization of relay winding R6 through time delay 252 to open contacts K6-2 to permit the frame to move only slightly past the rear end of the car.

The washing fluid from wash pipe 166 has been continuously sprayed on the car throughout the previously described washing operation of the front end and sides. The solenoid valve in rinse pipe 176 is closed during the first pass of the frame over the car.

A short period of time after drive units 28 and 30 are deenergized the spray of washing fluid from wash pipe 166 is terminated by opening of contacts K6-12 to deenergize solenoid 226 except for one nozzle which is beginning to purge the washing fluid from the pipe. Side brush 98 is then moved across the rear end of the car as shown in FIG. 12 in a forward stroke due to the closing of contacts K6-6 to energize solenoid 236 and return in a stroke with reversal of the direction of rotation under the control of cylinder 126' and motor 120' due to the opening of contacts K7-3 responsive to the energization of relay winding R7 after actuation of microswitch 238 to deenergize solenoid 236 and the opening of contacts K7-5 and the closing of contacts K7-6 to deenergize control relay 240 and energize control relay 232 in the same manner as described with respect to the washing of the front end of the car.

Similar to the washing of the front end of the car side brush 96 commences a forward and return stroke with reversal of the direction of rotation to wash the rear of the car at the time that side brush 98 is fully extended over half of the rear end of the car under the control of cylinder 126 and motor 120 due to the deenergization of solenoid 234 by the opening of contacts K8-4 and due to the deenergization of control relay 244 by the opening of contacts K8-3 and the energization of control relay 230 by the closing of contacts K8-2 in response to the energization of relay winding R8 caused by actuation of microswitch 242. The rear end of the car is thus washed in an overlapping manner by side brushes 96 and 98, and the time required to provide the overlapping washing is reduced to a minimum.

After washing of the rear end of the car, side brushes 96 and 98 return to their rest positions rotating counterclockwise and clockwise, respectively, and a short period of time thereafter drive units 28 and 30 are reversely energized by energization of control relays 254 and 256 due to the closing of contacts K9-2 caused by energization of relay winding R9 in response to microswitch 250 actuated by the return of side brush 96 to its rest position to drive frame 20 from the entrance of the wash bay and the rear end of the car towards the exit and the front end of the car.

Figure 14:
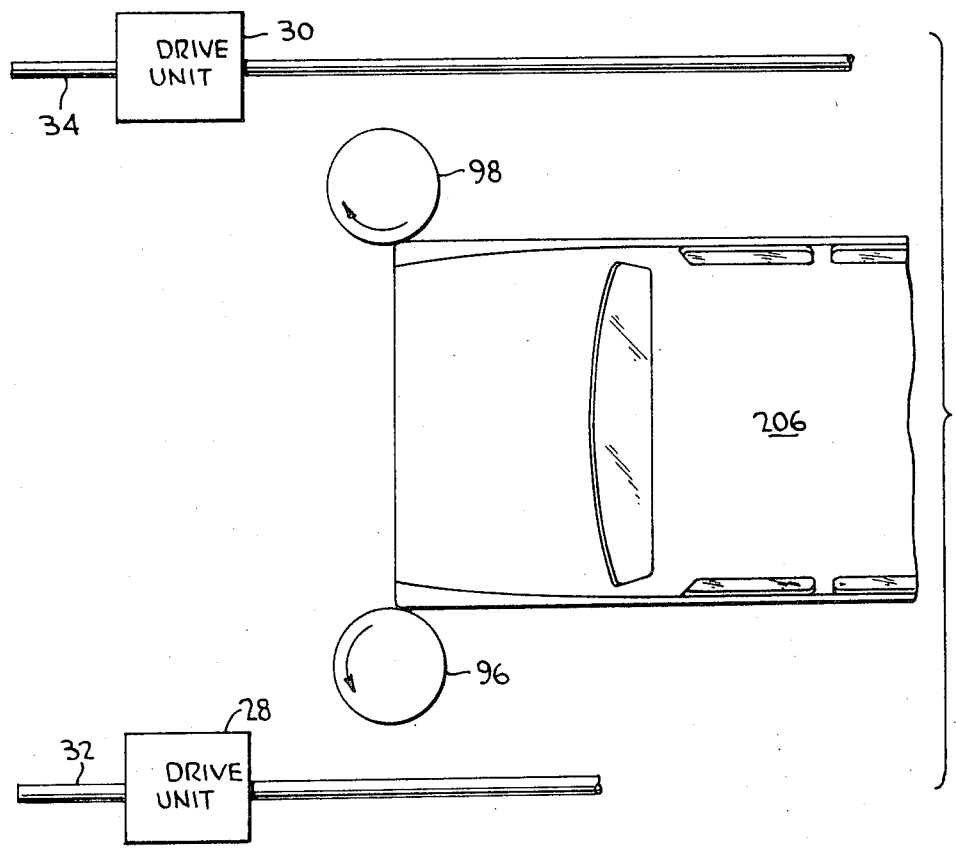
FIGS. 14 and 15 are diagrammatic plan views illustrating the rinsing of a vehicle by the apparatus of FIG. 1.
Figure 15:
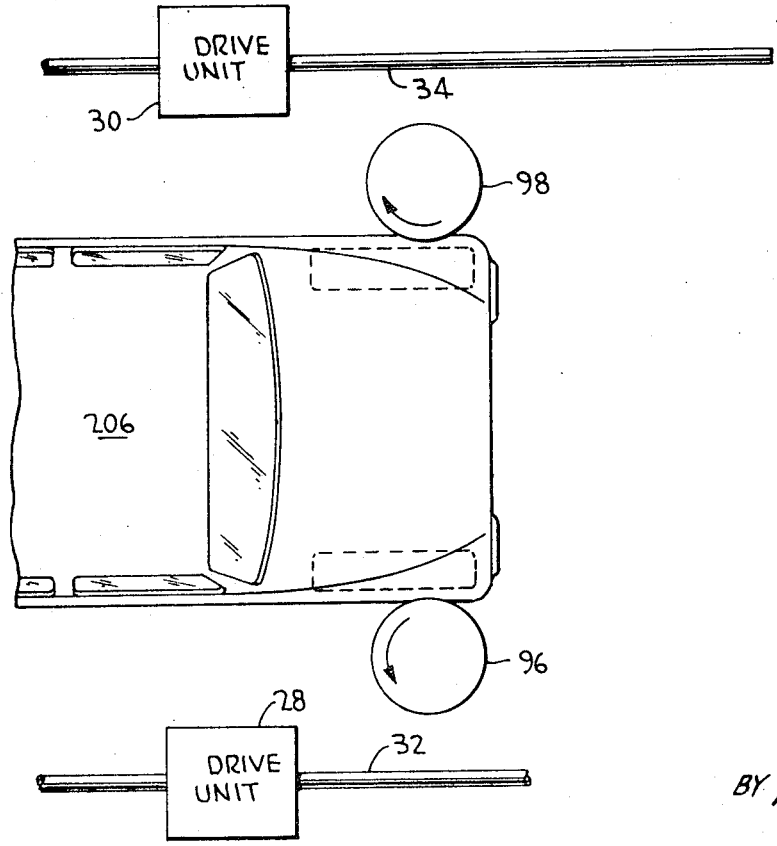

As shown in FIGS. 14 and 15 side brushes 96 and 98 are moved against the sides of the car by cylinders 126 and 126', respectively, due to energization of solenoids 234 and 236 by closure of contacts K9-3 and K2-2 after the high frequency link is interrupted by the car and aid in the rinsing of the car during the second pass of the frame over the car. Top brush 52 remains in its rest position during the second pass.

After completion of the first pass, the high pressure pump is switched to pump clear rinse water. The clean rinse water is sprayed from both wash pipe 166 and rinse pipe 176 immediately after completion of the washing of the rear end of the car such that during the delay before drive units 28 and 30 are reversely energized, the washing fluid is purged from the pipes and the car is saturated with rinse water. As the frame moves over the car toward the exit of the wash bay, wash pipe 166 and rinse pipe 176 continue to spray clean water on the car to thoroughly rinse the car. By randomly directing the nozzles on pipes 166 and 176 the entire car may be rinsed with clear water after the side brushes have operated against the side of the car during the return of frame 20.

Approximately 3 to 4 feet before frame 20 completes the second pass, the high pressure pump switches back to pump washing fluid, and the solenoid valve in rinse pipe 176 is closed. The remainder of the rinse water is purged through wash pipe 166 such that washing fluid is immediately available for the next car to be washed.

When frame 20 reaches its normal rest position at the exit of the wash bay, limit switch 258 carried by the frame is actuated to deactuate side brushes 96 and 98 and return them to their non-rotating rest positions and to deenergize drive units 28 and 30 in order to properly position frame 20 for the washing of another car by energizing a relay winding R10 to open contacts K10-2. Once the car exits the wash bay to open treadle switch 202, relay winding R11 is energized to open contacts K11-1 and deenergize relay winding R10 to ready the apparatus for the next car to be washed.

A light may be provided on the walls of the wash bay or frame 20 to indicate to the driver that the washing operation has been completed. After energization of the light, the driver may start the car and drive out the exit thereby permitting the next car to be washed to enter the wash bay.

The unique double-pivot structure of the side brush assemblies permits the extension of each of side brushes 96 and 98 to wash more than half of the front end and rear end of a vehicle while maintaining necessary washing pressure. The sequence of operation in washing the ends of the vehicle permits both side brushes to be washing the same end at the same time to thereby provide overlapping washing without loss of time.

The control circuitry for providing the above described sequence of operation may be constructed from interconnected relays and contacts, as shown sequence and timing mechanisms such as stepping switches, or other conventional components as will be appreciated by those of ordinary skill in the art.

In as much as the present invention is subject to many variations, modifications and changes in detail, it is intended that all matter described in the foregoing specification or shown in the accompanying drawings shall be interpreted as illustrative and not in a limiting sense.

What is claimed is:

1. Automatic vehicle washing apparatus comprising
a frame having a first side, a second side and a top;
driving means carried by said frame for moving said frame in first and second opposite directions;
top brush means;
a top brush support assembly including
    a rectangular support having parallel opposite side members pivotally supported on said top of said frame, a first end member transversely secured to said side members at one end thereof and a second end member transversely secured to said side members at an end thereof opposite said one end, a pair of arms pivotally mounted on said first end member rotatably supporting said top brush means, a counter balancing weight carried by said second end member, and adjustable balancing weight means mounted on one of said side members and movable along said one side member intermediate the ends thereof;
motor means for rotating said top brush means mounted on the side member of said rectangular support opposite said one side member carrying said adjustable balancing weight means such that said rectangular support is laterally balanced;
first and second side brush means;
first and second side brush support assemblies pivotally mounting said first and second side brush means on said first and second sides of said frame, respectively, each of said first and second side brush support assemblies including
    a first member having a first end pivotally supported on the respective side of said frame and a second end, a clevis member pivotally mounted on said second end of said first member and including a pair of arms supporting the respective side brush means, and a connecting rod having an invariable length pivotally secured to the respective side of said frame and said clevis member to control the position of the respective side brush means during movement of said side brush assemblies; and
motor means mounted on said clevis member of each of said first and second side brush assemblies for rotating said first and second side brush means.

2. The automatic vehicle washing apparatus as recited in claim 1 wherein said top brush support assembly includes a fluid motor having a cylinder mounted on said top of said frame and a piston rod controlled by said cylinder attached to said second end of said rectangular support such that movement of said piston rod controls movement of said top brush means.

3. The automatic vehicle washing apparatus as recited in claim 2 wherein each of said first and second side brush support assemblies includes a fluid motor having a cylinder mounted on said side of said frame and a piston rod controlled by said cylinder attached to said first member such that movement of said piston rod controls movement of said first and second side brush means.

4. The automatic vehicle washing apparatus as recited in claim 3 wherein said top brush support assembly includes stop plate means mounted on said frame and having angled sides to about said side members of said rectangular support and limit pivotal movement of said rectangular support.

5. Automatic vehicle washing apparatus comprising
a frame having first and second sides;
driving means carried by said frame for driving said frame in first and second opposite directions
first side brush means;
a first support assembly carrying said first side brush means mounted on said first side of said frame, said first support assembly being arranged to extend said first side brush means more than half the distance between said first and second sides of said frame;
second side brush means;

a second support assembly carrying said second side brush means and mounted on said second side of said frame, said second support assembly being arranged to extend said second side brush means more than half the distance between said first and second sides of said frame;

motor means for rotating said first and second side brush means; and control means including first means for operating said driving means to position said frame adjacent an end of a vehicle to be washed and second means responsive to said first means to move said first support assembly to extend and return said first side brush means to wash more than half of the end of the vehicle and, after commencement of movement of said first support assembly, to move said second support assembly to extend and return said second side brush means to wash more than half of the end of the vehicle without interfering with said first side brush means.

6. The invention as recited in claim 5 wherein said control means includes third means for causing said first side brush means to wash the end with a forward stroke while rotating in a first direction and with a return stroke while rotating in a second direction opposite said first direction, and said second side brush means to wash the end with a forward stroke while rotating in said second direction and with a return stroke while rotating in said first direction.

7. The invention as recited in claim 6 wherein said third means includes means for starting the forward stroke of said second side brush means in response to said first side brush means being fully extended on said forward stroke.

8. The invention as recited in claim 5 wherein said control means includes detecting means disposed on said frame to determine the position of said frame relative to the vehicle, said detecting means including means for actuating said second means when the end of the vehicle is detected.

9. The invention as recited in claim 8 wherein each of said first and second support assemblies includes a first member pivotally mounted on the respective side of said frame and a second member pivotally on said first member and supporting the respective side brush means.

10. The invention as recited in claim 8 wherein said frame has a top pivotally carrying top brush means, said control means includes fourth means actuated in response to return of said second side brush means after completion of washing of the end of the vehicle said first means being responsive to said fourth means to energize said driving means to drive said frame past the vehicle in said first direction after the end of the vehicle is washed and said second means being responsive to said fourth means to cause said first and second side brush means to make rotating contact with the sides of the vehicle, and said control means further includes fifth means for causing said top brush means to make rotating contact with the vehicle as said frame is driven in said first direction.

11. The invention as recited in claim 10 wherein said detecting means includes means for actuating said second means when the other end of the vehicle is detected such that said first side brush means washes more than half of the other end and said second side brush means washes more than half of the other end.

12. The invention as recited in claim 11 wherein said control means includes sixth means actuated in response to return of said second side brush means after completion of washing of the other end of the vehicle and seventh means responsive to said sixth means for energizing said driving means to drive said frame past the vehicle in said second direction after the other end of the vehicle is washed, said second means being responsive to said sixth means to cause said first side brush means and second side brush means to make rotating contact with the sides of the vehicle.

13. The invention as recited in claim 12 wherein spraying means are disposed on said frame to spray washing fluid on the vehicle when said driving means drives said frame in said first direction and to spray rinsing fluid on the vehicle when said driving means drives said frame in said second direction.

14. The invention as recited in claim 13 wherein said detecting means includes a high frequency transmitter disposed on said first side of said frame and a high frequency receiver disposed on said second side of said frame.

* * * * *